United States Patent [19]
Hozumi

[11] Patent Number: 5,989,778
[45] Date of Patent: Nov. 23, 1999

[54] PHOTO-CURING RESIN COMPOSITION FOR DVD

[75] Inventor: Shigeo Hozumi, Toyonaka, Japan

[73] Assignee: Sumitomo Chemical Company, Limited, Osaka, Japan

[21] Appl. No.: 09/107,479

[22] Filed: Jun. 30, 1998

[30] Foreign Application Priority Data

Jul. 3, 1997 [JP] Japan .................................... 9-178237

[51] Int. Cl.$^6$ ............................. G03C 1/725; C08F 2/46
[52] U.S. Cl. ..................... 430/281.1; 430/284.1; 430/280.1; 430/916; 522/38; 522/92; 522/167
[58] Field of Search ........................... 522/38, 101, 92, 522/167; 430/280.1, 281.1, 284.1, 916

[56] References Cited

U.S. PATENT DOCUMENTS

| | | | |
|---|---|---|---|
| 5,539,014 | 7/1996 | Swedo et al. | 522/91 |
| 5,573,831 | 11/1996 | Suzuki et al. | 428/64.1 |

FOREIGN PATENT DOCUMENTS

| | | |
|---|---|---|
| 0835917A1 | 4/1998 | European Pat. Off. . |
| 9-31416 | 2/1997 | Japan . |
| 9-169956 | 6/1997 | Japan . |
| 9-169957 | 6/1997 | Japan . |
| 10-1659 | 1/1998 | Japan . |
| 10-46109 | 2/1998 | Japan . |

*Primary Examiner*—Janet Baxter
*Assistant Examiner*—Rosemary Ashton
*Attorney, Agent, or Firm*—Birch, Stewart, Kolasch & Birch, LLP

[57] ABSTRACT

A layer for protection coating and adhesion of DVD is formed by a photo-curing resin composition which comprises a photo-curing component which is cured by polymerization reaction of a unsaturated group, a photo-polymerization initiator and a phenol-based primary antioxidant, wherein this photo-curing component comprises a bi-functional urethane acrylate, an epoxy acrylate containing a bisphenol A skeleton, and a N-vinyl lactam compound, said polymerization initiator comprising a mono or di-benzoylphosphine oxide compound in an amount of 0.1% by weight or more to less than 5.0% by weight based on the total amount of said photo-curing components, and the viscosity of this resin composition at 25° C. being in the range from 350 to 700 mPa·s.

10 Claims, 2 Drawing Sheets

Fig..1
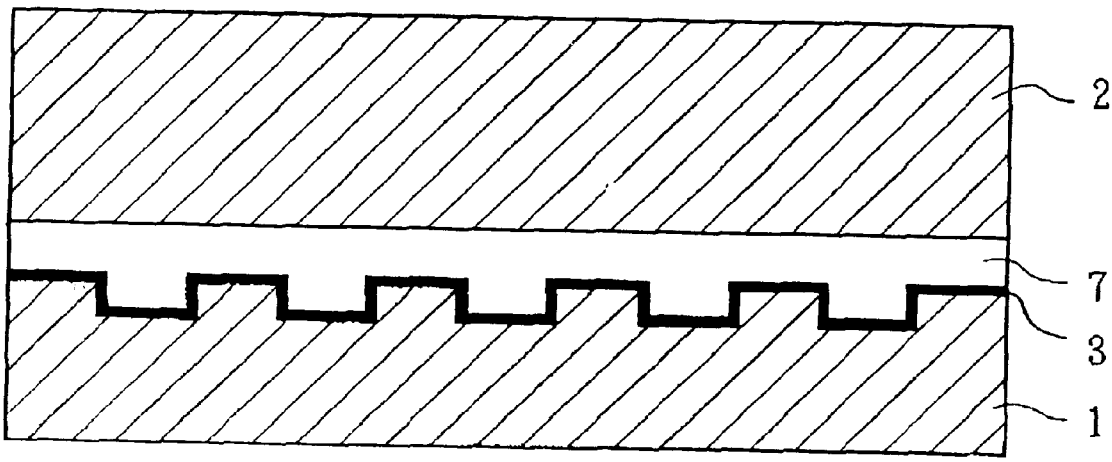
Fig. 2
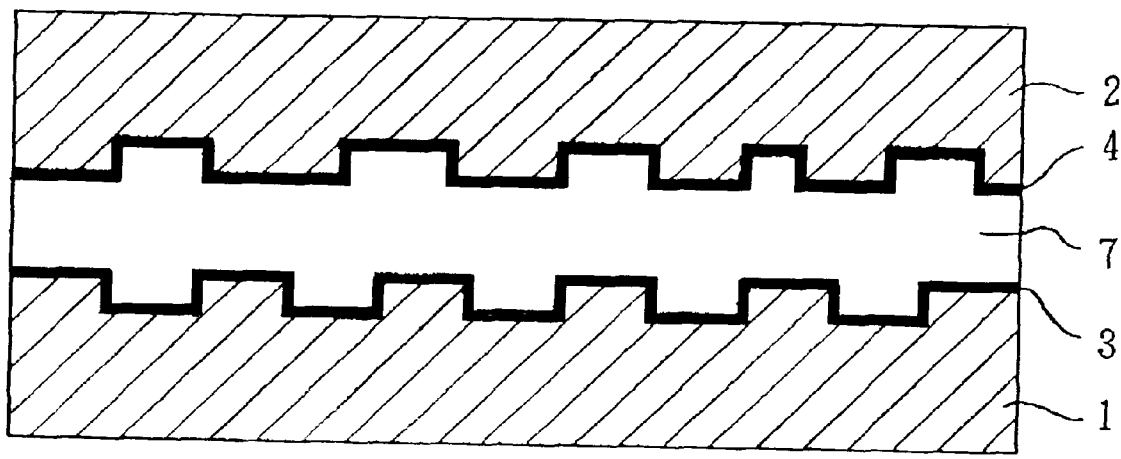

PHOTO-CURING RESIN COMPOSITION FOR DVD

The present invention relates to a photo-curing resin composition used for protection coating for a reflection film provided on at least one of the surfaces of the two substrates of DVD (digital video disk or digital versatile disk) which is one of photo information recording media and has structure of two pasted substrates composed of a polycarbonate-based resin, and used as an adhesive between the two substrates.

DESCRIPTION OF THE RELATED ART

CD (compact disk), similar to DVD, is well known as a photo information recording medium. A protection coat made from a photo-curing resin is usually provided for protecting a reflection film composed of aluminum deposited film formed on a substrate of CD. CD is composed of a single substrate constituted of a polycarbonate plate, and the protection coat is situated on the outermost side. Therefore, the resin composition for protection coat in CD is required to have hard coat-like functions such as low scratching property as well as protection function for the reflection film. As the result, there is used a composition which has relatively high density of a polymerizable unsaturated group such as an acrylate and can provide a coated film having high hardness, although its curing shrinkage being relatively high.

On the other hand, unlike CD, DVD is composed of two thin disk substrates pasted each other, and the reflection film is situated on the pasted surface, the inner surface, of the substrate. One example of such DVD is described in FIGS. 3 and 4, showing the schematic sectional views. In the DVD shown FIGS. 3 and 4, a first disk substrate 1 and a second disk substrate 2 are pasted. The disk substrates 1 and 2 are usually composed of a polycarbonate-based resin. A reflection film 3 is provided on the surface of the disk substrate 1 on which a pit is formed for recording information. The reflection film 3 is usually formed by vapor deposition of aluminum. A protection coat 5 is formed on the surface of the reflection film 3, and this protection coat is pasted via an adhesion layer 6 to the second disk substrate 2.

Shown in FIG. 3 is the single sided read system single layer type DVD referred to as "SD-5". In this structure, a pit for information recording is not formed on a second disk substrate 2, and a reflection film 3 provided on the surface of a first disk substrate 1 is placed facing the second disk substrate 2. A protection coat 5 is formed on the surface of the reflection film 3, and this protection coat is pasted via an adhesion layer 6 to the second disk substrate 2.

Shown in FIG. 4 is the single sided read system dual layer type DVD referred to as "SD-9". In this structure, a pit for information recording is formed on both disk substrates 1 and 2. Further, a translucent film 4 is provided on the pit surface of one disk substrate 2. On the translucent film 4 is formed a protection coat 5 according to the same manner as on the reflection film 3 on the substrate 1. The protection coat 5 on the translucent film 4 and the protection coat 5 on the reflection film 3 are adhered to each other with an adhesive layer 6. The translucent film 4 is constituted from a vapor deposited film of gold and the like. The structure shown in FIG. 4 also include the double sided read system dual layer type DVD referred to as "SD-10" in which the film on the substrate 2 also functions as a reflection film.

In DVD described above, the recording density of information is raised 8 times higher as compared with CD, and track pitch of a pit recording information is narrowed to about half of CD. As the result, when the disk substrate 1 or 2 is deformed due to a certain reason, damage to the pit is high, and there is high possibility that the recorded information can not be read out correctly. From these reasons, it is required in a protection coating for a reflection film used in DVD that shrinkage in curing is low and a disk substrate is not easily deformed, rather than hard coat-like functions. However, in conventional techniques, a composition used as a base component of a protection coating for CD is usually used as a protection coating for DVD.

When a composition used as a base component of a protection coating for CD is used as a protection coating for DVD, an adhesive is required for pasting two disk substrates in addition to the protection coating. As this adhesive, various materials are used such as a hot melt type adhesive and photo-curing type adhesive. When an adhesive is required in addition to a protection coating as described above, since separate steps of the formation of a protection coat and of pasting the substrates is required, the process for making DVD becomes complicated.

SUMMARY OF THE INVENTION

The object of the present invention is to provide a photo-curing resin composition for DVD, which has a function of protection coating of a reflection film formed on a disk substrate as well as an adhesion function for pasting two disk substrates.

The present inventors have intensively studied to develop a photo-curing resin composition having such two functions. As a result, it was found that the above-described object can be attained by a composition described below.

The present invention provides a photo-curing resin composition for protection coating and adhesion of DVD, which is used for pasting two disk substrates composing DVD and for protecting a reflection film provided on the surface of at least one of the two substrates, and which comprises (1) a photo-curing component which is cured by polymerization reaction of a unsaturated group, (2) a photo-polymerization initiator and (3) a phenol-based primary antioxidant;

in which the photo-curing component comprises (i) a bi-functional urethane acrylate, (ii) an epoxy acrylate having a bisphenol A skeleton, and (iii) a N-vinyl lactam compound represented by the following formula (I):

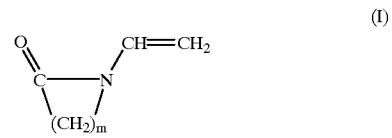

wherein m represents an integer from 3 to 5;
said polymerization initiator comprises a benzoylphosphine oxide compound represented by the following formula (II):

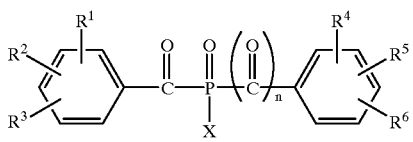

(II)

wherein each of $R^1$, $R^2$, $R^3$, $R^4$, $R^5$ and $R^6$ represents independently hydrogen, alkyl having 1 to 4 carbon atoms, alkoxy having 1 to 4 carbon atoms or halogen, X represents alkyl having 1 to 10 carbon atoms, or phenyl which is unsubstituted or substituted by a group selected from alkyl having 1 to 4 carbon atoms, alkoxy having 1 to 4 carbon atoms and halogen, and n represents 0 or 1, in an amount of 0.1% by weight or more to less than 5.0% by weight based on the total amount of said photo-curing components; and the viscosity of this resin composition at 25° C. is from 350 to 700 mPa·s.

When this composition is placed between two disk substrates and photo-cured, DVD is obtained in which the two disk substrates are adhered with the cured material of this composition and a reflection film is protected.

BRIEF EXPLANATION OF THE DRAWINGS

FIG. 1 is a schematic sectional view showing an example in which the resin composition of the present invention is applied to the single sided read system single layer type DVD.

FIG. 2 is a schematic sectional view showing an example in which the resin composition of the present invention is applied to the single sided read system dual layer type DVD.

DETAILED DESCRIPTION OF THE PREFERRED EMBODIMENTS

Figure 3:
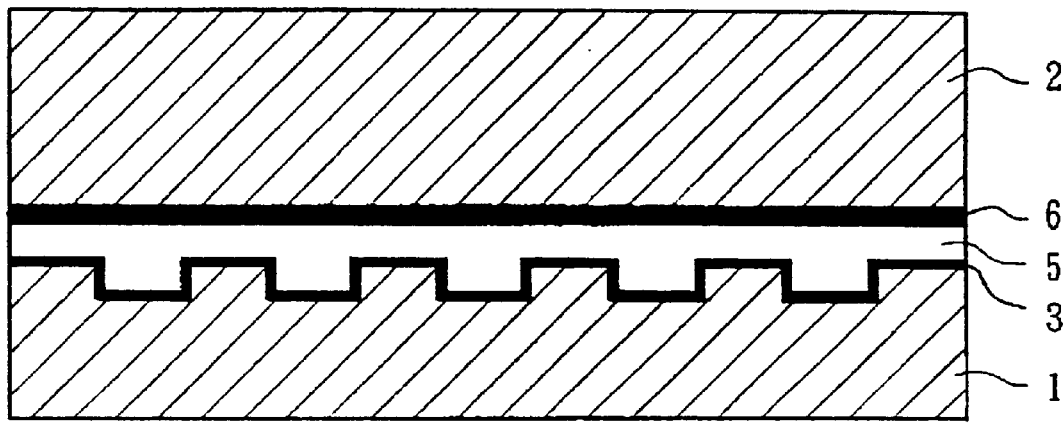
FIG. 3 is a schematic sectional view showing a conventional example of the single sided read system single layer type DVD.

A photo-curing type resin composition usually contains a photo-curing component which is cured by polymerization reaction of a unsaturated group. Such a photo-curing component can be selected from various monomers and oligomers of vinyl polymerization type.

Specific examples of the vinyl polymerization type monomers include vinyl esters such as vinyl acetate, vinyl propionate and branched vinyl esters of aliphatic acids; (meth) acrylates such as alkyl (meth)acrylates, glycidyl (meth) acrylate, diethylene glycol di(meth)acrylate, neopentyl glycol di(meth)acrylate, trimethylolpropane tri(meth) acrylate, pentaerythritol tetra(meth)acrylate, dipentaerythritol hexa(meth)acrylate and tetrahydrofurfuryl (meth) acrylate; vinyl aromatic hydrocarbons such as styrene, alkylstyrene and divinylbenzene; chlorine-containing unsaturated compounds such as chlorostyrene and chloro (meth) acrylate; N-vinylpyrrolidone, N-vinylcaprolactam, 2-hydroxy-3-phenoxypropyl acrylate, isobonyl acrylate, dicyclopentenyloxyethyl acrylate and the like.

Specific examples of the vinyl polymerization type oligomer include epoxy (meth)acrylate, polyester (meth) acrylate, polyether (meth)acrylate, urethane (meth)acrylate, silicone (meth)acrylate and the like.

The photo-curing component of the present invention comprises at least three components of
(i) a bi-functional urethane acrylate,
(ii) an epoxy acrylate containing a bisphenol A skeleton, and
(iii) a N-vinyl lactam compound represented by the above-described formula (I).

The bi-functional urethane acrylate is an oligomer which is usually produced by addition reaction of diisocyanate, polyol and 2-hydroxyalkyl acrylate. It is preferred that the bi-functional urethane acrylate does not contain an aromatic ring or that, although containing an aromatic ring, the urethane group, —NHCOO—, in the skeleton of the bi-functional urethane acrylate is not directly connected to the aromatic ring. When such a bi-functional urethane acrylate is used, change by time (particularly, yellowing) after curing of a resin composition containing it does not easily occur. Such a bi-functional urethane acrylate is derived from an aliptic diisocyanate, and is often called a non-yellowing type compound. Such an aromatic ring which is not directly connected by a urethane group is usually introduced from a polyol component.

Therefore, examples of the preferred diisocyanate used as a raw material of a bifunctinal urethane acrylate include aliphatic diisocyanates such as isophorone diisocyanate, trimethylhexamethylene diisocyanate, hexamethylene diisocyanate and hydrogenated diphenylmethane diisocyanate. Examples of the preferred polyol include polyether polyol such as polyethylene glycol, polypropylene glycol and polytetramethylene glycol, polyester polyol, caprolactone-modified diol, carbonate diol, polysiloxane polyol, and polyether polyol or polyester polyol addition products of bisphenol A. As a 2-hydroxyalkyl acrylate, 2-hydroxyethyl acrylate, 2-hydroxypropyl acrylate and the like are exemplified.

The bi-functional urethane acrylate preferably has a weight-average molecular weight in the range from 1000 to 10000. The content of the bi-functional urethnae acrylate is preferably in the range from 5 to 75% by weight, more preferably not less than 15% by weight and not more than 60% by weight based on the total amount of (1) the photo-curing components.

The epoxy acrylate containing a bisphenol A skeleton is a monomer or oligomer which contains a bisphenol A skeleton and an epoxy group ring-opened by addition of acrylic acid or methacrylic acid to the epoxy group. Examples of the epoxy acrylate containing a bisphenol A skeleton include an acrylate in which acrylic acid is added to diglycidyl ether in bisphenol A, and an acrylate in which bisphenol A is poly-added to diglycidyl ether in bisphenol A and acrylic acid is added to the terminal. The content of the epoxy acrylate containing a bisphenol A skeleton is preferably in the range from 1 to 50% by weight, more preferably not less than 5% by weight and not more than 30% by weight based on the total amount of (1) the photo-curing components.

When the bi-functional urethane acrylate and the epoxy acrylate having a bisphenol A skeleton are used together, shrinkage after curing decreases, the disk substrate is not easily deformed, and change by time after curing decreases.

The N-vinyllactam compound represented by the formula (I) has relatively high solubility in a polycarbonate-based resin which is used as a substrate. Therefore, if this compound is contained in the resin component, adhesion of a coated film to the substrate is improved and as a result, environmental test resistance of the coated film is improved. Examples of the N-vinyllactam compound represented by the formula (I) include N-vinyl-2-pyrrolidone and N-vinylcaprolactam. This compound is preferably used in an amount in the range from 10 to 40% by weight, more preferably not less than 15% by weight and not more than 30% by weight based on the total amount of the photo-curing components.

Various photo-curing compounds which is curable by a polymerization reaction of an unsaturated group may be contained in (1) the photo-curing components in addition to the three components (i), (ii) and (iii). As the photo-curing compounds, vinyl polymerization type monomers and vinyl polymerization type oligomer are exemplified. Examples of the vinyl polymerization type monomers, which may be contained in (1) the photo-curing components, include vinyl esters such as vinyl acetate, vinyl propionate and branched vinyl esters of aliphatic acids; (meth)acrylates such as alkyl (meth)acrylates, glycidyl (meth)acrylate, diethylene glycol di(meth)acrylate, neopentyl glycol di(meth)acrylate, trimethylolpropane tri(meth)acrylate, pentaerythritol tetra(meth)acrylate, dipentaerythritol hexa(meth)acrylate and tetrahydrofurfuryl (meth)acrylate; vinyl aromatic hydrocarbons such as styrene, alkylstyrene and divinylbenzene; chlorine-containing unsaturated compounds such as chlorostyrene and chloro (meth)acrylate; N-vinylpyrrolidone, N-vinylcaprolactam, 2-hydroxy-3-phenoxypropyl acrylate, isobonyl acrylate, dicyclopentenyloxyethyl acrylate and the like.

Examples of the vinyl polymerization type oligomer, which may be contained in (1) the photo-curing components, include epoxy (meth)acrylate, polyester (meth) acrylate, polyether (meth)acrylate, urethane (meth)acrylate, silicone (meth)acrylate and the like. above-described formula (I).

The photo-curing resin composition of the present invention further comprises (2) a photo-polymerization initiator for photo-curing, the benzoylphosphine oxide compound represented by the general formula (II), and as an antioxidant, (3) a phenol-based primary antioxidant.

When the benzoylphosphine oxide compound is used, adhesion to the two disk substrates and the reflection film provided on the surface of at least one of them increases. When a phenol-based primary antioxidant is used, environmental resistance, particularly heat resistance of the cured material increases.

In the formula (II) representing a benzoylphosphine oxide compound, each of $R^1$, $R^2$, $R^3$, $R^4$, $R^5$ and $R^6$ may be the same or different, and represents hydrogen, alkyl having 1 to 4 carbon atoms, alkoxy having 1 to 4 carbon atoms or halogen. Examples of the alkyl include methyl, ethyl, propyl, isopropyl, butyl, isobutyl and tert-butyl. Examples of the alkoxy include methoxy, ethoxy, propoxy and butoxy. Examples of the halogen include fluorine, chlorine and bromine. X represents phenyl or alkyl having 1 to 10 carbon atoms. The phenyl may be optionally substituted by a group selected from alkyl having 1 to 4 carbon atoms, alkoxy having 1 to 4 carbon atoms and halogen. Examples of the alkyl, alkoxy and halogen which may be substituted on the phenyl group include those exemplified for $R^1$ to $R^6$. The phenyl group represented by X can be substituted by 1 to 3 groups same to those exemplified for $R^1$ to $R^6$. Examples of the alkyl represented by X include methyl, ethyl, propyl, isopropyl, butyl, tert-butyl, pentyl, tert-pentyl, hexyl, octyl, 2-ethylhexyl, 2,4,4-trimethylpentyl, nonyl and decyl. When the number of carbon atoms is 3 or more, they may be straight or branched.

Examples of the benzoylphosphine oxide-based photo-polymerization initiator of the formula (II) which is current commercially available include 2,4,6-trimethylbenzoyldiphenylphosphine oxide (Lucilin TPO available from BASF Corp.), bis(2,4,6-trimethylbenzoyl) phenylphosphine oxide ("Irgacure 819" available from Ciba Specialty Chemicals Corp.), a mixed initiator consisting of bis(2,6 -dimethoxybenzoyl)(2,4,4-trimethylpentyl) phosphine oxide and 2-hydroxy-2-methylpropyophenone in a weight ratio of 1:3 ("Irgacure 1700" available from Ciba Specialty Chemicals Corp.), and a mixed initiator consisting of bis(2,6-dimethoxybenzoyl)(2,4,4-trimethylpentyl) phosphine oxide and 1-hydroxycyclohexylphenyl ketone in a weight ratio of 1:3 ("Irgacure 1800" available from Ciba Specialty Chemicals Corp.).

Examples of the benzoylphosphine oxide-based photo-polymerization initiator of the formula (II) further include benzoyldiphenylphosphine oxide, o- or p-toluoyldiphenylphosphine oxide, 4-tert-butylbenzoyldiphenylphosphine oxide, 2,6-dimethylbenzoyldiphenylphosphine oxide, 2,6-dimethoxybenzoyldiphenylphosphine oxide, 2,4,6-trimethoxybenzoyldiphenylphosphine oxide, 2,6-dichlorobenzoyldiphenylphosphine oxide, 2,6-dibromobenzoyldiphenylphosphine oxide and 2,3,4,6-tetramethylbenzoyldiphenylphosphine oxide.

The benzoylphosphine oxide compound of the formula (II) is comprised in an amount in the range of 0.1% by weight or more to less than 5% by weight based on the total amount of the above-described photo-curing components. When this amount is too small, sufficient effect is not obtained for improving adhesion even when other photo-polymerization initiator is used together. When the mount is too large, there is tendency that an adhesion layer after curing becomes opaque (whitening) due to change by time, and corrosion occurs on a reflection film. The preferable content of the benzoylphosphine oxide compound of the formula (II) is not less than 1% by weight and not more than 4% by weight based on the total amount of the photo-curing components.

In the present invention, other photo-polymerization initiator can be mixed with the benzoylphosphine oxide compound (II). Examples of the photo-polymerization initiator which can be used together with the benzoylphosphine oxide compound (II) include compounds having absorption in ultraviolet range such as benzophenone, benzyl, Michler's ketone, 2-chlorothioxanetone, 2,4-diethylthioxanetone, benzoylethyl ether, diethoxyacetophenone, benzyldimethyl ketal, 2-hydroxy-2-methylpropiophenone, 1-hydroxycyclohexylphenyl ketone, 2-methyl-1-[4-(methylthio)phenyl]-2-morpholinopropane-1-one, dimethylaminoacetophenone and 2,4-bis(trichloromethyl)-6-(4-methoxyphpenyl)-1,3,5-triazine; compound having absorption in visible range such as camphorquinone and 3-ketocumarine. These compounds may be used alone respectively in combination with the benzoylphosphine oxide compound of the formula (II), or two or more of them can be used in combination with the benzoylphosphine oxide compound of the formula (II). Optionally, a sensitizing agent and the like can be used together according to demands. Even when other photo-polymerization initiator than the benzoylphosphine oxide compound of the formula (II) is used, the total amount of the photo-polymerization initiators is preferably in the range from 0.5 to 20% by weight, more preferably not less than 1% by weight and not more than 10% by weight based on the total amount of the photo-curing components.

Further, the resin composition of the present invention comprises, as an essential component, a phenol-based primary antioxidant which enhances environmental resistance (particularly, heat resistance) of the cured material and exhibits little effect for disturbing curing reaction owing to photo-radical polymerization. This phenol-based primary antioxidant is a hindered phenol or one-end hindered phenol compound which has a phenol skeleton, contains tert-alkyl, such as tert-butyl, which is connected to at least one of two oppositions based on the phenolic hydroxyl group, and manifests antioxidant ability on various resins. Specific examples thereof include 2,6-di-tert-butyl-4-methylphenol, n-octadecyl 3-(3,5-di-tert-butyl-4-hydroxyphenyl) propionate, 2,2'-methylenebis(6-tert-butyl-4-methylphenol), 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate, 4,4'-butylidenebis(2-tert-butyl-5-methylphenol), 4,4'-thiobis(2-tert-butyl-5-ethylphenol), tetrakis[methylene 3-(3,5-di-tert-butyl-4-hydroxyphenyl)propionate]methane and 3,9 -bis[2-{3-(3-tert-butyl-4-hydroxy-5-methylphenyl)propionyloxy}-1,1-dimethylethyl]-2,4,8,10-tetroxaspiro[5.5]undecane. The phenol-based primary antioxidant is used in an amount preferably in the range from 0.005 to 5% by weight, more preferably not less than 0.01% by weight and not more than 3% by weight based on the total amount of the photo-curing components.

The resin composition of the present invention may further contain a filler such as silica and alumina, a polymer such as polymethyl methacrylate, polyethyl methacrylate and methyl methacrylate-hydroxyethyl acrylate copolymer, a flow controlling agent or levelling agent such as a fluorine-containing compound and sillicon-containing compound, and an antioxidant other than the phenol-based primary antioxidant; a photostabilizer, polymerization inhibitor and the like, as other additive component.

The viscosity of this resin composition is controlled in the range from 350 to 700 mPa·s at 25° C. to form a coated film having a uniform thickness of about 20 to 60 μm. This viscosity is preferably not less than 400 mPa·s and not more than 650 mPa·s. Especially, when a uniform coated film is formed by spincoating, the control of the viscosity of a resin solution is very important. When the viscosity is too low, specific film thickness can not be attained, and when the viscosity is too high, there occur some problems such that bubble is mixed into the resin, and the like. When the viscosity of the resin solution is high, it is possible to lower the viscosity and enlarge the viscosity range by raising the temperature of the resin solution. However, when temperature is raised, there occurs some problems such that the change by time of the resin solution is promoted, and the dissolving amount of a polycarbonate which constitutes a substrate increases.

Then, using embodiments of the resin composition of the present invention, and specific examples of DVD obtained by using them are explained referring to FIGS. 1 and 2. FIG. 1 is a schematic sectional view of DVD in which the resin composition of the present invention is applied to the single sided read system single layer type DVD referred to as SD-5 which corresponds to the structure in FIG. 3 showing the conventional example. On a first disk substrate 1 composed of a polycarbonate-based resin, a pit for information recording is formed, and the surface of the pit is covered by a reflection film 3. This reflection film is usually formed by vapor deposition of aluminum. A second disk substrate 2 composed of a polycarbonate-based resin faces the pit surface of the first substrate 1, and a layer for protection coating and adhesion 7 is provided between a reflection film 3 on the substrate 1 and the substrate 2.

Figure 4:
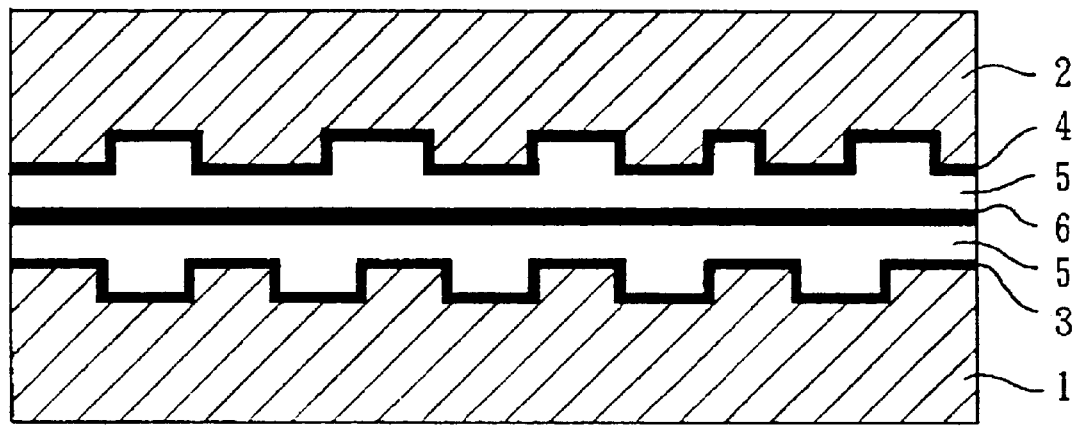
FIG. 4 is a schematic sectional view showing a conventional example of the single sided read system dual layer type DVD.

FIG. 2 is a schematic sectional view of DVD in which the resin composition of the present invention is applied to the single sided read system dual layer type DVD referred to as SD-9 which corresponds to the structure in FIG. 4 showing the conventional example. In this example, on both two disk substrates 1, 2, a pit for information recording is formed, and the pit surface on the disk substrate 1 is coated with a reflection film 3 and the pit surface on the disk substrate 2 is coated with a translucent film 4. The reflection film 3 is usually formed by vapor deposition of aluminum, and the translucent film 4 is usually formed by vapor deposition of gold and the like, respectively. The pit surfaces of the disk substrates 1 and 2 face to each other in inner side, and therein, a layer for protection coating and adhesion 7 is provided.

The resin composition of the present invention is used for forming the layer for protection coating and adhesion 7 shown in FIGS. 1 and 2. This layer for protection coating and adhesion 7 can be formed, for example, as described below. First, the above-described resin composition is uniformly coated by spin coating and the like on one substrate of the disk substrates 1 and 2, i.e. on the reflection film 3 in the case of the substrate 1 on which a refection film 3 is formed or on the translucent film 4 in the case of the substrate 2 on which a translucent film 4 is formed. Then, the coated substrate is pasted with other disk substrate so that the thickness of the layer for protection coating and adhesion 7 composed of the above-described resin composition will be uniformly from 20 to 60 μm. Alternatively, the above-described resin composition is poured between the two disk substrates 1 and 2, and then, the disk substrates 1 and 2 are rotated for spin coating to spread the resin composition so that the thickness of the layer for protection coating and adhesion 7 composed of the above-described resin composition will be uniformly from 20 to 60 μm.

Thereafter, in the case of one side reading and one-layer recording type as shown in FIG. 1, a light is emitted in given amount from the side of the disk substrate 2 on which no pit for information recording and no reflection film are formed for curing the resin composition forming the layer for protection coating and adhesion 7. On the other hand, in the case of one side reading and two-layers recording type as shown in FIG. 2, a light is emitted from the side of the second disk substrate 2 on which the translucent film 4 is formed, for curing the resin composition forming the layer for protection coating and adhesion 7. Further, the resin composition of the present invention can be applied also to the double sided read system dual layer type DVD. In this case, since a certain light can slightly penetrate the refection films respectively provided on the facing surfaces of the two disks, the layer for protection coating and adhesion 7 is formed from the resin composition of the present invention according to the above-described method, when at least one reflection film is made as a layer which allows a light to penetrate relatively easily, or a light having high penetration ability is used The following example further illustrates the present invention in detail, but does not limit the scope thereof. In examples, the viscosity was measured with B-type viscometer using rotor No. 2 at 30 rpm, 25° C. In examples, following compounds were used for components of the compositions. All of the following compounds are commercially available and indicated with their trade names.

(A) Photo-curing component (A1) Bi-functional urethane acrylate

EBECRYL 270 (manufactured by Daicel UCB): bi-fuctional urethane acrylate of aliphatic polyether polyol type having no aromatic ring UX-6101 (manufactured by Nippon Kayaku Co.): bi-functinal urethane acrylate of no-yellowing polyester polyol type in which a benzene ring is contained, but a urethane group is not directly connected to the benzene ring.

UX-4101 (manufactured by Nippon Kayaku Co.): bi-functinal urethane acrylate of no-yellowing polyester polyol type in which a benzene ring is contained, but a urethane group is not directly connected to the benzene ring.

Aronix M-1310 (manufactured by Toagosei Co.): bi-functinal urethane acrylate of yellowing polyester polyol type in which a benzene ring is contained, and a urethane group is directly connected to the benzene ring.

UX-2301 (manufactured by Nippon Kayaku Co.): bi-functinal urethane acrylate of yellowing polyether polyol type in which a benzene ring is contained, and a urethane group is directly connected to the benzene ring.

(A2) Epoxy acrylate having a bisphenol A skeleton

Ripoxy SP-1519 (Showa Kobunshi Co.): bisphenol A diglycidyl ether diacrylate (A3) Other mono-functional photo-polymerization monomer N-V-2P/RC (manufactured by ISP Investment Co.): N-vinyl-2-pyrrolidone V-Cap/RC (manufactured by ISP Investment Co.): N-vinylcaprolactam Viscoat 150 (manufactured by Osaka Yuki Kagaku Co.): tetrahydrofurfuryl acrylate Aronix M-5700 (menufactured by Toagosei Co.): 2-hydroxy-3-phenoxypropyl acrylate QM-589 (manufactured by Rohm & Haas Co.: isobornyl acrylate FA-513A (manufactured by Hitachi Chemical Co., Ltd.): tricyclodecane acrylate HO (manufactured by Kyoeisya Kagaku Co.): 2-hydroxyethyl methacrylate MANDA (manufactured by Nippon Kayaku Co.): hydroxypivalic acid neopentyl glycol diacrylate (B) Photopolymerization initiator (B1) Benzoylphosphine oxde compound of formula (I)

Lucilin TPO (manufactured by BASF Corp.): 2,4,6-trimethylbenzoyldiphenylphosphine oxide Irgacure 1800 (Ciba Specialty Chemicals Corp.): mixture of bis(2,6-dimethoxybenzoyl)(2,4,6 -trimethylpentyl) phosphine oxide and 1-hydroxycyclohexylphenyl ketone in a ratio by weight of 1:3

(B2) Other photo-polymerization initiator

Irgacure 184 (Ciba Specialty Chemicals Corp.): 1-hydroxycyclohexylphenyl ketone

Irgacure 907 (Ciba Specialty Chemicals Corp.): 2-methyl-1-[4-(methylthio)phenyl]-2-morpholinopropane-1-on (C) Phenol-based primary antioxidant Sumilizer BHT (manufactured by Sumitomo Chemical Co., Ltd.): 2,6-di-tert-butyl-4-methylphenol

EXAMPLES 1 TO 4 AND COMPARATIVE EXAMPLES 1 TO 6

Preparation of Sample for Evaluation

Each resin composition shown in Table 1 was dropped on a polycarbonate substrate for DVD having a thickness of 0.6 mm, and this was laminated with other substrate, and the formed laminate was rotated for spin coating so that the resin composition was uniformly spread between the two substrates. The revolution speed of the spin coating was controlled so that the thickness of the film after curing of the composition between the substrates was about 40 μm at a resin temperature of about 25° C. These polycarbonate substrates having a thickness of 0.6 mm for DVD are a round plate having a diameter of 12 cm. One of the substrates records a signal and has an aluminum film formed by vapor deposition, and remaining one is a dummy plate which does not record a signal and has no vapor deposited aluminum film. A ultraviolet ray of about 300 mJ/cm2 was emitted from the side of the dummy polycarbonate substrate to the sample in which the resin composition had been uniformly coated between the two substrates in order to cure the resin composition, using a high pressure mercury lamp.

TABLE 1-1

| | Example | | | |
|---|---|---|---|---|
| Example No. | 1 | 2 | 3 | 4 |
| Resin composition (parts by weight) (A1) | | | | |
| EBECRYL 270 | 41.0 | 45.0 | — | — |
| UX-6101 | — | — | 36.2 | 31.9 |
| Aronix M-1310 | — | — | — | — |
| (A2) | 20.8 | 7.9 | 12.2 | 17.5 |
| Ripoxy SP-1519 | | | | |
| (A3) | | | | |
| N-V-2P/RC | 19.1 | 23.5 | — | — |
| V-Cap/RC | — | — | 25.8 | 25.3 |
| Viscoat 150 | 19.1 | — | 25.8 | 25.3 |
| Aronix M-5700 | — | 15.7 | — | — |
| QM-589 | — | 7.9 | — | — |
| (B1) | 2.5 | 1.0 | 2.5 | 2.5 |
| Lucilin TPO | | | | |
| (B2) | | | | |
| Irgacure 184 | 2.5 | 1.0 | 2.5 | 2.5 |
| Irgacure 907 | — | — | — | — |
| (C) | | | | |
| Sumilizer BHT | 0.05 | 0.05 | 0.05 | 0.05 |
| Viscosity at 25° C. | 500 | 530 | 480 | 490 |

TABLE 1-2

|  | Comparative Example | | | | | |
|---|---|---|---|---|---|---|
| Example No. | 1 | 2 | 3 | 4 | 5 | 6 |
| Resin composition (parts by weight) (A1) | | | | | | |
| EBECRYL 270 | 41.0 | 41.0 | 41.0 | — | 45.0 | 50.0 |
| UX-6101 | — | — | — | — | — | — |
| Aronix M-1310 | — | — | — | 41.0 | — | — |
| (A2) | 20.8 | 20.8 | 20.8 | 20.8 | 7.9 | — |
| Ripoxy SP-1519 | | | | | | |
| (A3) | | | | | | |
| N-V-2P/RC | 19.1 | 19.1 | — | 19.1 | 23.5 | 25.0 |
| V-Cap/RC | — | — | — | — | — | — |
| Viscoat 150 | 19.1 | 19.1 | 38.2 | 19.1 | — | — |
| Aronix M-5700 | — | — | — | — | 15.7 | 16.7 |
| QM-589 | — | — | — | — | 7.9 | 8.3 |
| (B1) | 5.0 | — | 2.5 | 2.5 | — | 1.0 |
| Lucilin TPO | | | | | | |
| (B2) | | | | | | |
| Irgacure 184 | 5.0 | 2.5 | 2.5 | 2.5 | 2.5 | 1.0 |
| Irgacure 907 | — | 1.0 | — | — | 1.0 | — |
| (C) | | | | | | |
| Sumilizer BHT | 0.05 | 0.05 | 0.05 | 0.05 | 0.05 | 0.05 |
| Viscosity at 25° C. | 530 | 560 | 520 | 950 | 610 | 410 |

Evaluation of Sample

First, whether given film thickness (40 μm) was obtained under the possible using condition of the apparatus, or not, was evaluated.

Film thickness controlling property

◯: A thickness of 40 μm is obtained by controlling the using condition of the apparatus within the possible using condition range.

X: A thickness of 40 μm is not obtained by controlling the using condition of the apparatus within the possible using condition range.

Then, whether bubble was mixed in the resulted coated film or not was visually observed, and evaluated according to the following standard.

Bubble mixing property

◯: No bubble mixing is recognized.

Δ: Bubble mixing is sometimes recognized in a plurality of tests.

X: Bubble mixing is recognized every time.

The resin composition for DVD after curing is required to manifest physical properties such as high adhesion to a polycarbonate or aluminum deposited film, low curing shrinkage property which does not allow bending of a substrate easily, suitable Young's modulus property and glass transition point, low water absorption and the like. In addition, the resin composition is also required to maintain these physical properties after environmental tests, for example, at a temperature of 80° C. and a relative humidity of 85% for 96 hours. In order to evaluate these physical properties in easier manner and reasonably, there was adopted an environmental test method at a temperature of 105° C. and a relative humidity of 100% for 48 hours. A composition which did not show defects in appearance such as pealing and bending after this environmental test is supposed to manifest no defect even after an environmental test method at a temperature of 80° C. and a relative humidity of 85% for 96 hours, likewise.

More concretely, the sample made as described above was charged in a pressure cooker apparatus which is operated under condition of a temperature of 105° C. and a relative humidity of 100% and kept for 48 hours. Then, the sample was taken out, and changes in appearance are visually evaluated such as pealing between substrates, occurrence of opaqueness (whitening) in an adhesive layer, yellowing of an adhesive layer, corrosion of an aluminum deposited film and bending of a substrate. Then, a knife is applied weakly to the resin layer between the substrates for trying to peel the layer, and whether sufficient adhesion has been made or not is checked. All of the resin compositions used in the test in Examples and Comparative Examples were selected form those exhibiting sufficient adhesion to both the polycarbonate and aluminum deposited film before the test.

Result

The evaluation results are shown in Table 2. It is apparent form the results that compositions of Examples 1, 3 and 4 have not only functions as an adhesive but also sufficient functions as a protection coating agent for the reflection film (aluminum deposited film). In the composition of Example 2, peeling between substrates was not recognized, and adhesion was relatively low, however, other functions were excellent. If the amount of the photo-polymerization initiator is increased, or other photo-polymerization initiator, for example, Irgacure 907 is further used depending on occasions, adhesion is further improved.

On the other hand, the compositions of Comparative Examples exhibit poor spin coating suitability and often cause defects in appearance such as peeling between substrates, occurrence of opaqueness (whitening) or yellowing in an adhesive layer, corrosion of an aluminum deposited film. Therefore, the balance between the functions as an adhesive and the function as a protection film for the reflection film (aluminum deposited film) was not admitted as good.

TABLE 2

| | Example | | | | Comparative Example | | | | | |
|---|---|---|---|---|---|---|---|---|---|---|
| Example No. | 1 | 2 | 3 | 4 | 1 | 2 | 3 | 4 | 5 | 6 |
| Spin coating suitability | | | | | | | | | | |
| Film thickness controlling property (40 µm) | ○ | ○ | ○ | ○ | ○ | ○ | ○ | ○ | ○ | ○ |
| Bubble mixing property | ○ | ○ | ○ | ○ | ○ | ○ | ○ | X | ○ | ○ |
| Evaluation result after environmental test | | | | | | | | | | |
| Peeling between substrates | none | none | none | none | none | none | recognized | recognized | none | recognized |
| Opaqueness of adhesive layer | none | none | none | none | recognized | none | none | recognized | recognized | recognized |
| Yellowing of adhesive layer | none | none | none | none | none | none | none | recognized | none | none |
| Corrosion of aluminum deposited film | none | none | none | none | recognized | none | none | recognized | none | none |
| Bending of substrate | none | none | none | none | none | recognized | recognized | none | none | none |
| Adhesion between substrates | kept | lowered | kept | kept | lowered | lowered | peeled | peeled | lowered | peeled |
| Total evaluation | ⊚ | ○ | ⊚ | ⊚ | X | X | X | X | X | X |

The adhesion of the compositions of Examples with the polycarbonate substrate having a gold deposited film was excellent. The composition coated between the polycarbonate substrates having aluminum deposited films on both surfaces can be photo-polymerized. Therefore, the composition of the present invention can be fully used for SD-9 and SD-10.

COMPARATIVE EXAMPLES 7–10

The resin composition shown in Table 3 (none of them contain a phenol-based primary antioxidant) was spin-coated between two polycarbonate substrates according to the same manner as in Example 1, and film thickness controlling property and bubble mixing property in conducting spin-coating were evaluated. The results are summarized in Table 3.

TABLE 3

| Comparative Example | 7 | 8 | 9 | 10 |
|---|---|---|---|---|
| Resin composition (parts by weight) | | | | |
| (A1) | | | | |
| UX-4101 | 20.0 | 30.0 | 20.0 | 20.0 |
| UX-2301 | — | — | 10.0 | — |
| (A2) | 30.0 | 20.0 | 30.0 | 20.0 |
| Ripoxy SP-1519 | | | | |
| (A3) | | | | |
| Viscoat 150 | — | 20.0 | 20.0 | 40.0 |
| FA-513A | 50.0 | — | — | 20.0 |
| HO | — | 10.0 | 20.0 | — |
| MANDA | — | 20.0 | — | — |
| (B1) | | | | |
| Lucilin TPO | — | — | — | 7.0 |
| Irgacure 1800 | 3.0 | 2.0 | 1.0 | — |
| (B2) | | | | |
| Irgacure 184 | 3.0 | 5.0 | 5.0 | — |
| Viscosity at 25° C. (mPa.s) | 2010 | 780 | 890 | 480 |

TABLE 3-continued

| Comparative Example | 7 | 8 | 9 | 10 |
|---|---|---|---|---|
| Spin coating suitability | | | | |
| Film thickness controlling property (40 µm) | ○ | ○ | ○ | ○ |
| Bubble mixing property | X | Δ | X | ○ |

As is apparent from Table 3, bubble mixing property of the compositions of Comparative Examples 7 to 9 in conducting spin-coating is not sufficient. On the other hand, spin-coating property of the composition of Comparative Examples 10 is excellent including film thickness controlling property and bubble mixing property. However, since the amount of Lucilin TPO which is a phosphine oxide-based photo-polymerization initiator is large, it is supposed that corrosion of the aluminum deposited film easily occurs if the above-described results of Comparative Example 1 are also taken into consideration together.

REFERENCE EXAMPLES 1 AND 2

Change in heat resistance due to presence and absence of a phenol-based primary antioxidant was evaluated, and the results are shown blow. The resin composition shown in Table 4 was spin-coated between the two polycarbonate substrates in the same manner as in Example 1, and film thickness controlling property and bubble mixing property in conducting spin-coating were evaluated. Regarding both composition, 40 µm film thickness controlling property and bubble mixing property were excellent. Further, the resulted polycarbonate pasted substrates were maintained in boiling water. Regarding the substrates in Reference Example 1, peeling occurred in boiling of 16 hours, however, regarding the substrates in Reference Example 2, no peeling occurred between the two substrates and adhesion was maintained even after boiling of 40 hours. In these examples, it was recognized that heat resistance was improved by the presence of a phenol-based primary antioxidant even when a phosphine oxide-based photo-polymerization initiator was not compounded.

TABLE 4

| | Example No. | 1 | 2 |
|---|---|---|---|
| | Resin composition (parts by weight) | | |
| (A1) | EBECRYL 270 | 30.0 | 30.0 |
| (A2) | Ripoxy SP-1519 | 10.0 | 10.0 |
| (A3) | N-V-2P/RC | 30.0 | 30.0 |
| | Aronix M-5700 | 20.0 | 20.0 |
| | QM-589 | 10.0 | 10.0 |
| (B2) | Irgacure 184 | 2.5 | 2.5 |
| | Irgacure 907 | 1.0 | 1.0 |
| (C) | Sumilizer BHT | — | 0.05 |
| | Viscosity at 25° C. (mPa.s) | 450 | 400 |

When the resin composition of the present invention is applied to DVD, formation of a protection coating and adhesion of two substrates can be conducted simultaneously, and the resulted DVD has excellent environmental test resistance and excellent in adhesion between substrates.

What is claimed is:

1. A photo-curing resin composition for protection coating and adhesion of DVD which comprises (1) a photo-curing component which is cured by polymerization reaction of a unsaturated group,
   (2) a photo-polymerization initiator and
   (3) a phenol-based primary antioxidant;
in which the photo-curing component comprises
   (i) a bi-functional urethane acrylate,
   (ii) an epoxy acrylate having a bisphenol A skeleton, and
   (iii) a N-vinyl lactam compound represented by the following formula (I):

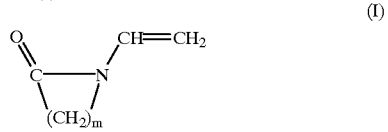

(I)

wherein m represents an integer from 3 to 5;
said polymerization initiator comprises a benzoylphosphine oxide compound represented by the following formula (II):

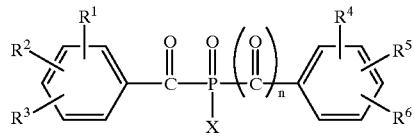

(II)

wherein each of $R^1$, $R^2$, $R^3$, $R^4$, $R^5$ and $R^6$ represents independently hydrogen, alkyl having 1 to 4 carbon atoms, alkoxy having 1 to 4 carbon atoms or halogen, X represents alkyl having 1 to 10 carbon atoms, or phenyl which is unsubstituted or substituted by a group selected from alkyl having 1 to 4 carbon atoms, alkoxy having 1 to 4 carbon atoms and halogen, and n represents 0 or 1, in an amount of 0.1% by weight or more to less than 5.0% by weight based on the total amount of said photo-curing components; and the viscosity of this resin composition at 25° C. being from 350 to 700 mPa·s.

2. The composition according to claim 1, wherein the urethane group in the skeleton of the bi-functional urethane acrylate is not directly connected to an aromatic ring.

3. The composition according to claim 1, wherein the amount of bi-functional urethane acrylate is in the range from 5 to 75% by weight based on the total amount of (1) the photo-curing components.

4. The composition according to claim 1, wherein the amount of the epoxy acrylate containing bisphenol A skeleton is in the range from 1 to 50% by weight based on the total amount of (1) the photo-curing components.

5. The composition according to claim 1, wherein the N-vinyllactam compound is N-vinyl-2-pyrrolidone.

6. The composition according to claim 1, wherein the N-vinyllactam compound is N-vinylcaprolactam.

7. The composition according to claim 1, wherein the amount of N-vinyllactam compound is in the range from 10 to 40% by weight based on the total amount of (1) the photo-curing components.

8. The composition according to claim 1, wherein the benzoylphosphine oxide compound is 2,4,6-trimethylbenzoyldiphenylphosphine oxide.

9. The composition according to claim 1, wherein (2) the photo-polymerization initiator contains a compound other than the benzoylphosphine oxide compound represented by the formula (I) in claim 1, and the total amount of the (2) photo-polymerization initiators is in the range from 0.5 to 20% by weight based on the total amount of (1) the photo-curing components.

10. The composition according to claim 1, wherein the amount of phenol-based primary antioxidant is in the range from 0.005 to 5% by weight based on the total amount of (1) the photo-curing components.

* * * * *